C. C. FARMER.
CAR DOOR AND BRAKE CONTROL EQUIPMENT.
APPLICATION FILED APR. 8, 1920.

1,410,289. Patented Mar. 21, 1922.

INVENTOR
CLYDE C. FARMER
BY *Wm. M. Cady*
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR DOOR AND BRAKE CONTROL EQUIPMENT.

1,410,289.

Specification of Letters Patent. Patented Mar. 21, 1922.

Application filed April 8, 1920. Serial No. 372,116.

*To all whom it may concern:*

Be it known that I, CLYDE C. FARMER, a citizen of the United States, residing at Edgewood, in the county of Allegheny and State of Pennsylvania, have invented n and useful Improvements in Car Door and Brake Control Equipments, of which the following is a specification.

This invention relates to car door and brake controlling devices, and more particularly to an equipment of the double end type.

It has heretofore been proposed to equip cars with a safety control equipment such that the operation of the car including the control of the brakes and the doors could be handled by one man.

In some localities where cars of the above character are used, it has been found desirable under certain conditions to provide a conductor in addition to the motorman and at certain points, the conductor must open and close the rear door to admit and discharge passengers.

The principal object of my invention is to provide means whereby the conductor at the non-operating end of the car may control the rear door without interfering with the control of the car by the motorman at the operating end of the car.

Figure 1:
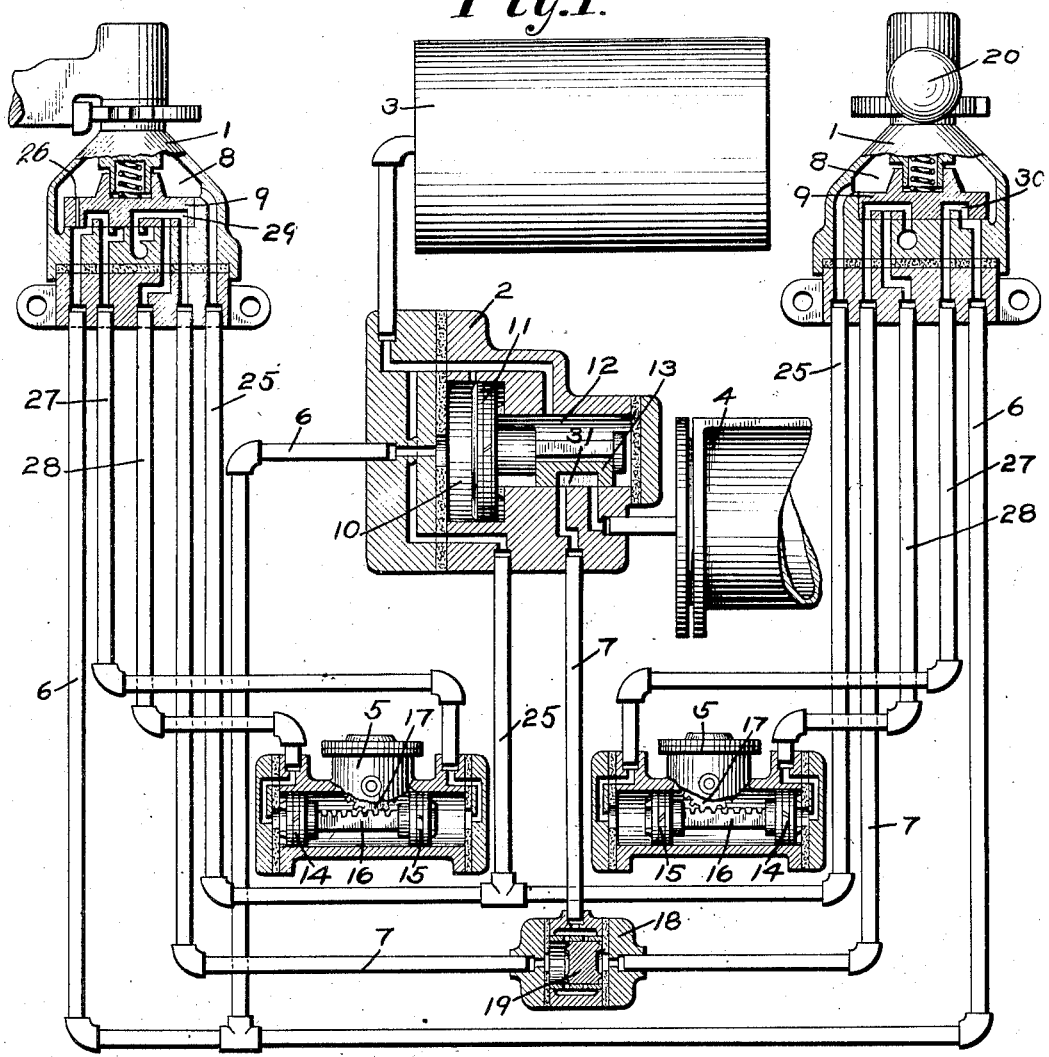

In the accompanying drawing; Fig. 1 is a diagrammatic view, partly in section, of a car door and brake controlling equipment, embodying my invention; and Fig. 2 a plan view of the brake valve device, with a conductor's operating handle applied thereto.

As shown in the drawing, the equipment may comprise a brake valve device 1 at each end of the car, an emergency valve device 2, a main reservoir 3, a brake cylinder 4, a door engine 5 for controlling the doors at each end of the car, a brake pipe 6, and a straight air pipe 7.

The brake valve device 1 may comprise a casing, having a valve chamber 8, containing a rotary slide valve 9 having ports for controlling the car doors and the brakes.

The emergency valve device 2 may comprise a casing having a piston chamber 10 connected to brake pipe 6 and containing piston 11 and a valve chamber 12 connected to main reservoir 3 and containing a slide valve 13.

Each door engine 5 may comprise a casing containing pistons 14 and 15 connected by a stem 16 having rack teeth for operating a gear 17 through which the car doors are opened and closed.

Interposed in the straight air pipe 7 is a valve device 18 comprising a casing containing a double check valve 19 for controlling communication through the straight air pipe from the brake valve device at either end of the car to the brake cylinder 4.

Figure 2:
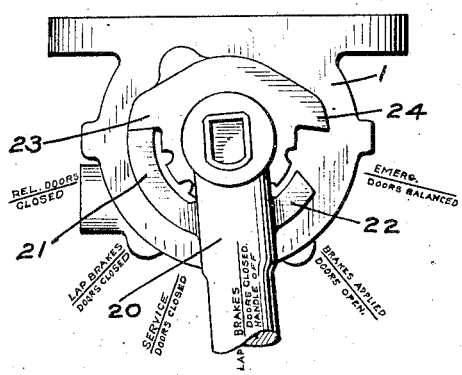

The conductor's brake valve handle is constructed so that the movement is limited to the door opening and closing positions as shown in Fig. 2 of the drawing, in which the handle 20 is provided with lugs 21 and 22 adapted to engage the respective stops 23 and 24 on the brake valve, so that the handle can only be moved between the positions of doors closed—handle off and doors open—brakes applied.

In operation, assuming that the car is being operated by the motorman controlling the brake valve at the left hand of Fig. 1 of the drawing, if the brake valve is in release position, as shown, fluid will be supplied from the main reservoir 3 through the main reservoir supply pipe 25 to the valve chamber 8 and thence flows through the port 26 in the rotary valve to the brake pipe 6.

Fluid under pressure is also supplied through the door closing pipe 27 to the piston 15 of the door engine 5. The door opening pipe 28 and the straight air pipe 7 are connected to the atmosphere through a cavity 29 in the rotary valve 9.

The pistons 14 and 15 will therefore be shifted to the position shown, in which the car door at the operating end of the car is held closed.

At the non-operating end, the conductor applies the conductor's handle to the brake valve in the handle off position where the handle is left while running.

In this position, the straight air pipe 7 and the door opening pipe 28 are connected to the exhaust, while fluid under pressure is supplied from the brake pipe 6 through cavity 30 in the rotary valve 9 to the door closing pipe 27, so that the door engine 5 at the non-operating end of the car operates to hold the rear door closed.

If the motorman makes a straight air application of the brakes, fluid supplied to the straight air pipe 7, from the operating end of the car, shifts the double check valve 19 to the position shown in the drawing, cutting off communication to the brake valve at the non-operating end and permitting fluid to flow from the straight air pipe through cavity 31 in the slide valve 13 to the brake cylinder 4.

If the conductor wishes to open the rear door, he can do so by moving the conductor's handle to the brakes applied, door open position, in which ports in the brake valve are adapted to supply fluid under pressure to the door opening pipe 28 and exhaust fluid from the door closing pipe 27.

In this position, fluid is also supplied to the straight air pipe 7 and if the brakes have not already been applied by the motorman, then the double check valve 19 will be shifted to the left by straight air pressure and fluid will be admitted to the brake cylinder from the straight air pipe at the non-operating end of the car, so that the rear door can not be opened by the conductor unless the brakes are applied.

Having now described my invention, what I claim as new and desire to secure by Letters Patent, is:—

1. In a car brake and door controlling apparatus, the combination with a brake valve device and a door engine for controlling the car doors at each end of the car, of a straight air pipe, a brake cylinder, and a double check valve in said pipe adapted to cut off communication from the straight air connection of one brake valve device to the brake cylinder when fluid under pressure is supplied to the straight air pipe by the other brake valve device, each brake valve having a position for supplying fluid under pressure to the straight air pipe and to the corresponding door engine for effecting the opening of the car door.

2. In a car brake and door controlling apparatus, the combination with a brake cylinder, a straight air pipe leading to opposite ends of the car, and a double check valve for controlling communication from the straight air pipe to the brake cylinder, of a door engine at each end of the car and a corresponding brake valve device having a position for supplying fluid under pressure to the straight air pipe and to the door engine for operating said door engine to open the car door and apply the brakes.

3. In a car brake and door controlling apparatus, the combination with a brake cylinder, a straight air pipe leading to opposite ends of the car, and a double check valve for controlling communication from the stright air pipe to the brake cylinder, of a door engine at each end of the car and a corresponding brake valve device having one position for supplying fluid under pressure to the straight air pipe and to the door engine for opening the corresponding car door and another position for connecting the straight air pipe with the exhaust and for supplying fluid under pressure to the door engine for closing the car door.

4. In a car brake and door controlling apparatus, the combination with a brake pipe, a brake cylinder, and a door engine at each end of the car, of a brake valve device at each end of the car, a straight air pipe, and a double check valve in the straight air pipe for controlling communication from the brake valve device at each end of the car to the brake cylinder, each brake valve device having a position for connecting the straight air pipe with the atmosphere and for supplying fluid from the brake pipe to the door engine for operating said engine to hold the corresponding car door closed.

In testimony whereof I have hereunto set my hand.

CLYDE C. FARMER.